US009990382B1

United States Patent
Dias

(10) Patent No.: US 9,990,382 B1
(45) Date of Patent: Jun. 5, 2018

(54) SECURE ERASURE AND REPAIR OF NON-MECHANICAL STORAGE MEDIA

(71) Applicant: Amazon Technologies, Inc., Reno, NV (US)

(72) Inventor: Paulo Miguel Cordeiro Dias, São Paulo (BR)

(73) Assignee: Amazon Technologies, Inc., Reno, NV (US)

( * ) Notice: Subject to any disclaimer, the term of this patent is extended or adjusted under 35 U.S.C. 154(b) by 241 days.

(21) Appl. No.: 13/860,346

(22) Filed: Apr. 10, 2013

(51) Int. Cl.
*G06F 17/30* (2006.01)

(52) U.S. Cl.
CPC .. *G06F 17/30303* (2013.01); *G06F 17/30174* (2013.01); *G06F 17/30289* (2013.01); *G06F 17/30575* (2013.01)

(58) Field of Classification Search
CPC .......... G06F 17/30117; G06F 12/0246; G06F 17/30174; G06F 17/30575; G06F 17/30289
USPC ........ 707/812, 805, 634; 711/103, 155, 114, 711/159, 166; 713/193
See application file for complete search history.

(56) References Cited

U.S. PATENT DOCUMENTS

| | | | | |
|---|---|---|---|---|
| 5,265,159 A * | 11/1993 | Kung | .......................... | 713/193 |
| 5,818,763 A * | 10/1998 | Villa et al. | ............... | 365/185.29 |
| 6,157,577 A * | 12/2000 | McPartland | ............. | 365/189.05 |
| 6,731,447 B2 * | 5/2004 | Bunker et al. | .................. | 360/60 |
| 7,124,170 B1 * | 10/2006 | Sibert | ................... | G06F 12/145 |
| | | | | 709/216 |
| 7,668,883 B2 * | 2/2010 | Tran et al. | ..................... | 711/159 |
| 8,099,545 B2 * | 1/2012 | Biswas | ............... | G06F 12/0246 |
| | | | | 365/185.29 |
| 8,117,414 B2 * | 2/2012 | Erez | ...................... | G06F 3/0623 |
| | | | | 711/103 |
| 8,130,554 B1 * | 3/2012 | Linnell | ..................... | 365/185.28 |
| 8,234,477 B2 * | 7/2012 | Shaath | ................ | G06F 12/1466 |
| | | | | 711/163 |
| 8,250,380 B2 * | 8/2012 | Guyot et al. | ................... | 713/193 |
| 8,682,868 B2 * | 3/2014 | Ghuge | ................ | G06F 17/3015 |
| | | | | 707/692 |
| 8,738,935 B1 * | 5/2014 | Brooker | ............. | G06F 21/6218 |
| | | | | 713/193 |
| 8,762,431 B2 * | 6/2014 | Wang | ................ | G06F 17/30117 |
| | | | | 707/821 |

(Continued)

OTHER PUBLICATIONS

"ATA Secure Erase" downloaded Apr. 10, 2013 from ata.wiki.kernel.org/index.php/ATA_Secure_Erase, pp. 1-6.

(Continued)

*Primary Examiner* — Frantz Coby
(74) *Attorney, Agent, or Firm* — Robert C. Kowert; Meyertons, Hood, Kivlin, Kowert & Goetzel, P.C.

(57) ABSTRACT

Repair and secure erasure of non-mechanical storage devices may be performed. In at least some embodiments, a non-mechanical storage device may be detected and device information may be obtained for the non-mechanical storage device. Based, at least in part, on the device information, it may be determined whether the non-mechanical storage device is eligible for secure erasure. For an eligible device, a secure erase procedure may be initiated and success or failure of the secure erasure procedure may be reported. In at least some embodiments, firmware bugs may be detected and repaired when performing the secure erasure procedure.

20 Claims, 5 Drawing Sheets

(56) References Cited

U.S. PATENT DOCUMENTS

| | | | | |
|---|---|---|---|---|
| 9,111,621 B2* | 8/2015 | Krutzik | | G06F 21/80 |
| 2007/0260811 A1* | 11/2007 | Merry, Jr. | | G06F 12/0246 |
| | | | | 711/103 |
| 2008/0028168 A1* | 1/2008 | Muraoka | | 711/159 |
| 2008/0091605 A1* | 4/2008 | Hughes | | G06F 21/31 |
| | | | | 705/51 |
| 2008/0140909 A1* | 6/2008 | Flynn et al. | | 711/100 |
| 2008/0263993 A1* | 10/2008 | Chillson | | 52/718.01 |
| 2009/0254572 A1* | 10/2009 | Redlich et al. | | 707/10 |
| 2009/0276474 A1* | 11/2009 | Sela | | G06F 17/30218 |
| 2010/0138619 A1* | 6/2010 | Benavides | | G06F 21/6218 |
| | | | | 711/159 |
| 2010/0174865 A1* | 7/2010 | Koester | | G06F 21/80 |
| | | | | 711/114 |
| 2010/0230073 A1* | 9/2010 | Kotani et al. | | 165/67 |
| 2010/0318810 A1* | 12/2010 | Strom | | G06F 21/79 |
| | | | | 713/190 |
| 2011/0055588 A1* | 3/2011 | DeHaan | | G06F 1/3209 |
| | | | | 713/189 |
| 2012/0093318 A1* | 4/2012 | Obukhov | | G06F 21/6209 |
| | | | | 380/277 |
| 2012/0255012 A1* | 10/2012 | Sallam | | 726/24 |
| 2012/0255013 A1* | 10/2012 | Sallam | | 726/24 |
| 2012/0255014 A1* | 10/2012 | Sallam | | 726/24 |
| 2012/0278564 A1* | 11/2012 | Goss et al. | | 711/155 |
| 2013/0144845 A1* | 6/2013 | Ghuge | | G06F 17/3015 |
| | | | | 707/692 |
| 2014/0022849 A1* | 1/2014 | Krutzik | | G06F 21/80 |
| | | | | 365/185.33 |
| 2014/0143475 A1* | 5/2014 | Kasorla et al. | | 711/103 |

OTHER PUBLICATIONS

Gordon Hughes and Tom Coughlin "Secure Erase of Disk Drive Data" pp. 1-8.

* cited by examiner

SECURE ERASURE AND REPAIR OF NON-MECHANICAL STORAGE MEDIA

BACKGROUND

As the technological capacity for organizations to create, track, and retain information continues to grow, a variety of different technologies for managing and storing the rising tide of information have been developed. Secure and reliable data storage is one such technology that helps satisfy the need to maintain this collected information. In order to implement secure and reliable storage, large numbers of a variety of different storage devices may need to be maintained for use in data storage systems. Maintenance of these storage devices, however, may prove onerous as specific technical expertise may be required to diagnose and repair failing storage devices and expensive equipment may be necessary to securely dispose of non-repairable storage devices.

Figure 1:
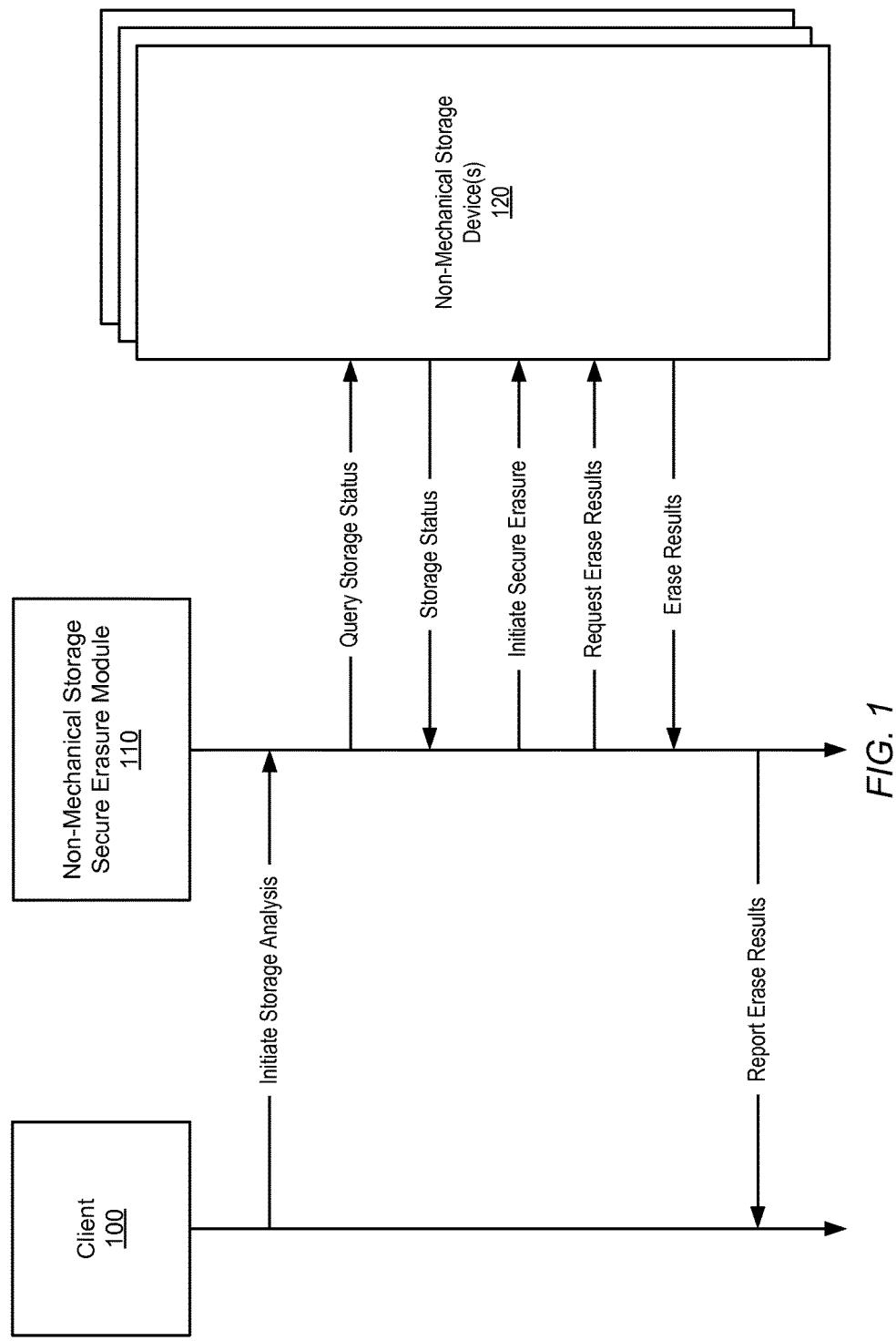
FIG. 1 illustrates a sequence diagram of an secure erasure and repair of non-mechanical storage, according to some embodiments.

While embodiments are described herein by way of example for several embodiments and illustrative drawings, those skilled in the art will recognize that embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include," "including," and "includes" mean including, but not limited to.

DETAILED DESCRIPTION OF EMBODIMENTS

In the following detailed description, numerous specific details are set forth to provide a thorough understanding of claimed subject matter. However, it will be understood by those skilled in the art that claimed subject matter may be practiced without these specific details. In other instances, methods, apparatus, or systems that would be known by one of ordinary skill have not been described in detail so as not to obscure claimed subject matter.

It will also be understood that, although the terms first, second, etc. may be used herein to describe various elements, these elements should not be limited by these terms. These terms are only used to distinguish one element from another. For example, a first contact could be termed a second contact, and, similarly, a second contact could be termed a first contact, without departing from the scope of the present invention. The first contact and the second contact are both contacts, but they are not the same contact.

The terminology used in the description of the invention herein is for the purpose of describing particular embodiments only and is not intended to be limiting of the invention. As used in the description of the invention and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

Various embodiments of secure erasure and repair of non-mechanical storage media are described herein. Common forms of data storage include various means storing data physically on magnetic, optical or other similarly recordable storage media. These devices typically use one or more mechanical components, such as rotating disks and actuator arms, to read, write, and otherwise manipulate data stored on the device. When a device no longer functions or has reached the end of its useful life, many different ways exist to permanently erase or destroy the data resident on the mechanical storage device so that it may no longer be recovered and/or read. For example, for magnetic-based mechanical storage devices, a magnet may be used to effectively destroy content stored on the device. However, with the advent of non-mechanical storage devices that persist stored data in different ways, new methods of assuring the permanent and unrecoverable erasure of data may be developed.

Non-mechanical storage devices may be storage devices that store and persist data without mechanical components. Various types of non-mechanical storage devices exist and may be implemented using various technologies, including but not limited to NAND-based flash memory or other types of electronic circuits configured to persist data without the use of moving mechanical parts. In at least some embodiments, non-mechanical storage devices include solid state drives (SSDs) which may be configured to communicate with other devices via standardized communication protocols and connections established for traditional mechanical storage devices, such as hard disk drives.

Data persisted on non-mechanical storage devices may not be effectively erased or destroyed using techniques traditionally applied to mechanical storage devices. Instead, in order to assure the permanent and unrecoverable erasure of data stored on non-mechanical storage devices, physical destruction, such as grinding, may be employed to ensure that no data cell or other remnant of the non-mechanical storage device may remain for data recovery. More recently, some non-mechanical storage devices have implemented functions that allow for data persisted on non-mechanical storage devices to be permanently erased electronically (hereinafter referred to as "secure erasure"). For example, some non-mechanical storage devices are configured to send a high voltage signal, e.g., 20 volts, to permanently reset the representation of data stored electrically in the non-mechanical storage device. However, configuring devices to receive and perform secure erasure often proves challenging, sometimes requiring specialized tools and/or technical expertise. Moreover, other problems or errors resident on the non-mechanical storage device, such as firmware bugs, may remain undetected.

A user or client, such as a technician, operator, or other person or entity tasked with performing secure erasure on these devices may implement the various embodiments described herein to provide for the secure erasure of non-mechanical storage devices. FIG. 1 illustrates a sequence diagram of an secure erasure and repair of non-mechanical storage devices, according to some embodiments. Client 100 may be a user, such as a technician, or other system or device, such as a diagnostic tool, that may interact with non-mechanical storage secure erasure module 110 to perform secure erasure and repair on one or more non-mechanical storage devices 120.

As noted above, client 100 may a be a user, such as human operator, or a client computing device, such as diagnostic tool or more generally any other computing device like computing system 1000 described below with regard to FIG. 5, which communicates with non-mechanical storage secure erasure module 110. Such communication may include interacting with a user interface and/or other input/output device configured to receive requests and indicate to non-mechanical storage secure erasure module 110 to perform various tasks, such as indicated by the various communications illustrated in FIG. 1. For example, client 100 may send a request or indication to non-mechanical storage secure erasure module 110 to initiate storage analysis.

Non-mechanical storage secure erasure module 110 may be a component of a specially configured tool, such as a diagnostic tool, or other general computing device or system, such as described below in further detail with regard to FIG. 2, configured to communicate with non-mechanical storage devices 120. These non-mechanical storage devices may, for example, be connected over various physical interfaces, such as cabling or hardware configured to connect one or more non-mechanical storage devices (e.g., a multi-port docking station). Communications between non-mechanical storage secure erasure module 110 and non-mechanical storage devices 120 may be formatted according to various standard (e.g., device drivers for Serial ATA (SATA) connections) or customized communication protocols.

As illustrated in FIG. 1, non-mechanical storage device 120 status information may be queried by non-mechanical storage secure erasure module 110. For example, in some embodiments when communication is established with non-mechanical storage device 120, status information concerning device 120 may be stored in a location accessible to non-mechanical storage secure erasure module 110, such as in system information collected by an operating system or other system component. Alternatively, in some embodiments, non-mechanical storage secure erasure module 110 may request status information directly from non-mechanical storage device 120 (as illustrated in FIG. 1).

Based on the storage status information obtained from non-mechanical storage device 120, non-mechanical storage secure erasure module 110 may determine whether non-mechanical storage is eligible for secure erase. For example, in some embodiments, non-mechanical storage secure erasure module 110 may detect a firmware bug, or other malady, on non-mechanical storage device 120 that is repairable (or possibly repairable via secure erase). Other determinations may also be made, such as whether non-mechanical storage device 120 is in a frozen operational state, or whether non-mechanical storage 120 has been previously subjected to unauthorized access. In at least some embodiments, a user may interact with non-mechanical storage secure erasure module 110 to provide input to various confirmation messages or other indications that may determine the particular operations applied to non-mechanical storage device 120.

If determined eligible, non-mechanical storage secure erasure module 110 may initiate a secure erasure procedure on non-mechanical storage device 120. This procedure may be implemented by a controller or other component on non-mechanical storage device 120 that is configured to perform the secure erase procedure (e.g., send a 20 volt signal to all storage cells on the device) on non-mechanical storage device 120. Non-mechanical storage secure erasure module 110 may subsequently request device information (such as analytics data) to determine whether the secure erase procedure completed successfully. Further analysis, such as determining whether a firmware bug remains or determining whether the erased or repaired device may be acceptable for further use or service, may be performed. Non-mechanical storage secure erasure module 110 may then report erase results, such as success, failure, firmware bugs detected and/or repaired, as well as the results of other analysis or determinations to client 100. Such reports may be indicated, displayed, or otherwise communicated to client 100 via a user interface.

Embodiments of secure erasure and repair of non-mechanical storage media may be implemented in a variety of different systems, such as diagnostic, monitoring, or control systems that interact with and/or maintain non-mechanical storage devices. More generally, any system or computing device that may communicate with a non-mechanical storage device may implement various embodiments of secure erasure and repair of non-mechanical storage media, and thus, the previous examples need not be limiting as to various other systems envisioned.

Example Embodiments of a Non-Mechanical Storage Secure Erasure Module

As discussed above, various methods and techniques of secure erasure and repair of non-mechanical storage media may be implemented in a variety of different computing systems and devices. FIG. 2 is a block diagram illustrating an example non-mechanical storage secure erasure module, according to some embodiments. As illustrated, non-mechanical storage secure erasure module 200 may communicate with non-mechanical storage devices 220 via storage interface 210, as well as receive user input 202 to perform these various method and techniques of secure erasure and repair of non-mechanical storage media, such as those discussed below as well as those discussed with regard to FIGS. 3 and 4.

Figure 2:
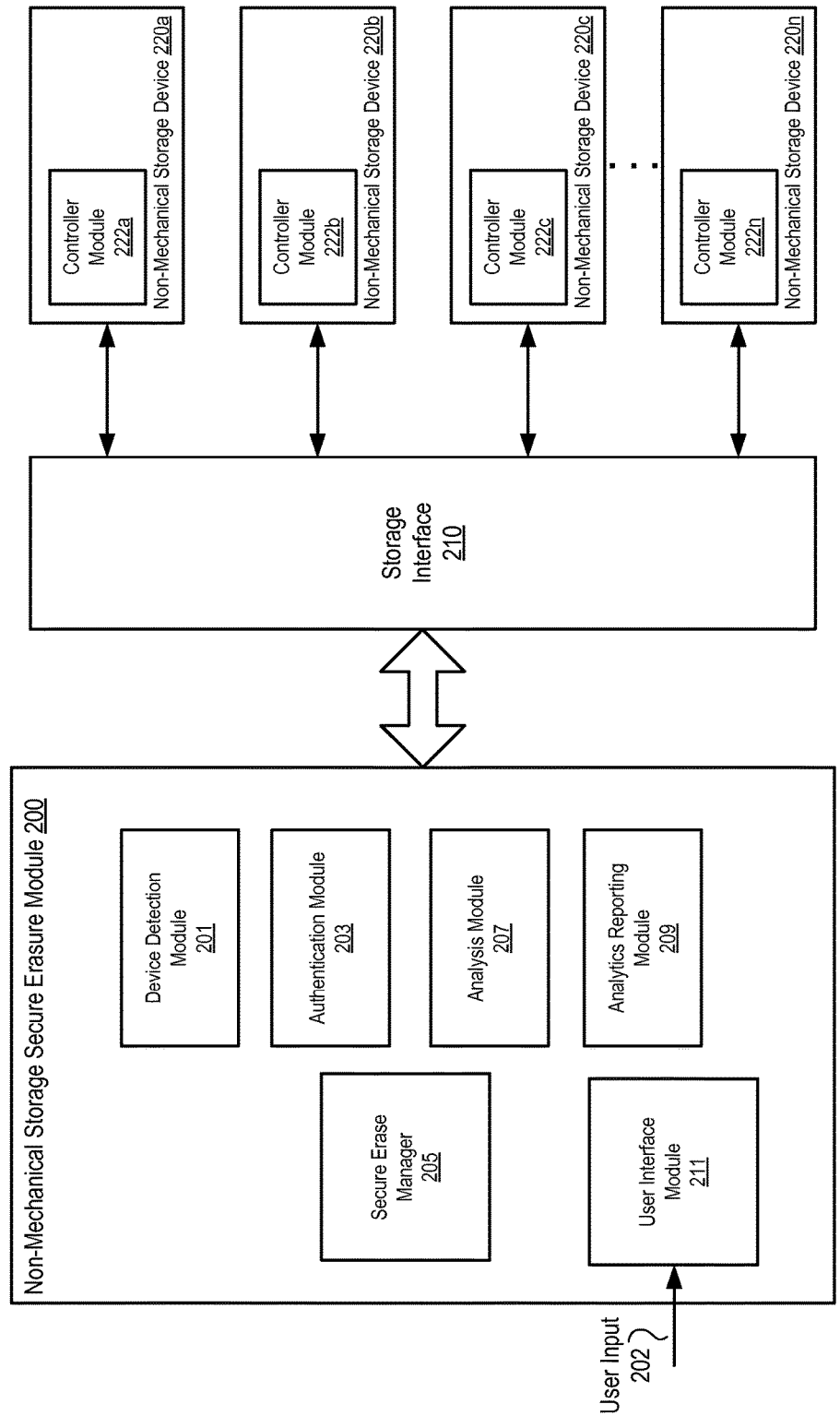
FIG. 2 is a block diagram illustrating an example non-mechanical storage secure erasure module, according to some embodiments.

Various non-mechanical storage devices 220a-n are illustrated in FIG. 2. These devices, as noted above, may be storage devices that read, write and otherwise manage and store data without mechanical means. Such devices may be implemented using various components and technologies such as multiple NAND-based flash components configured to store data, or other circuit components. In at least some embodiments, non-mechanical storage devices include a solid state drive (SSD). A controller module 222 may also be implemented to direct the performance of various tasks and operations for implementing data storage on non-mechanical storage device 220, including but not limited to support for writes, reads, error correction, wear leveling, bad block mapping, read scrubbing and read disturb management, read and write caching, garbage collection, and encryption. Controller module 222 may also be configured to initiate a secure erase procedure that may electronically erase data stored on non-mechanical storage device 220 such that it is unreadable and unrecoverable (e.g., by sending a 20 volt signal to all flash cells on the device). Multiple ones of non-mechanical storage devices 220 may be arranged or communicated with in various formats. For example, non-mechanical storage devices may be arranged as redundant array of independent disks (RAID).

Multiple non-mechanical storage devices 220a-n may be connected to (or coupled to or linked to) or configured to communicate via storage interface 210. Storage interface 210 may be configured to conform to various standard communication techniques and protocols, including but not limited to Universal Serial Bus (USB), IEEE 1394 interface, Serial ATA (SATA), external SATA (eSATA), and/or Power over eSATA (eSATAp). Storage interface 210 may be a hardware component or device, such as a device in a slot or connection on a motherboard, a hardware interface or control software, such as a device, driver, or any other combination of hardware or software configured to facilitate communication between non-mechanical storage devices 220 and non-mechanical storage secure erasure module 200, and as such, the previous description is not intended to be limiting. In at least some embodiments, storage interface 210 may support communication for multiple non-mechanical storage devices 220a-n, as illustrated, with non-mechanical storage secure erasure module 200.

In some embodiments, non-mechanical storage secure erasure module 200 may implemented on a specialized or general computing device, such as described below with regard to FIG. 5. Non-mechanical storage secure erasure module 200 may be configured to communicate with non-mechanical storage devices 220 via interaction with storage interface 210, such as through device drivers or other hardware communication support that may be provided by an operating system or other hardware or software component. For example, in at least some embodiments, non-mechanical storage secure erasure module 200 may be configured to communicate directly with a controller module 222 to send and receive various requests, commands, or messages. Alternatively, in some embodiments, non-mechanical storage secure erasure module 200 may utilize another component, such as library or system call implemented by an operating system or device driver software, to communicate indirectly with non-mechanical storage device 220 (or controller module 222). For example, various wrapper functions may be implemented to invoke these libraries and/or system calls to communicate with non-mechanical storage device 220.

Non-mechanical storage secure erasure module 200 may implement a secure erase manager 205, in some embodiments. Secure erase manager 205 may be responsible for directing the various other sub-components or modules (e.g., device detection module 201, authentication module 203, analysis module 207, analytics reporting module 209, and user interface module 211) in performing their various tasks. State information about the current operation of non-mechanical storage secure erasure module 200 may be preserved such that in the event of system failure non-mechanical storage secure erasure module may resume or detect the last operations performed. Secure erase manager 205 may determine whether any external hardware or software components may be required to perform secure erasure and repair, such as be determining whether various support libraries to perform various operations exist to perform certain system calls, or whether certain files have been allocated for the non-mechanical storage secure erasure module to access or modify. In at least some embodiments secure erase manager 205 may record an operation log for each non-mechanical storage device that may be reported, such as via user interface module 211.

In at least some embodiments secure erase manager 205 may be configured to initiate the secure erase procedure on one or more non-mechanical storage devices 220. The secure erase procedure may be initiated by performing one or more system calls or other requests or commands (e.g., formatted according to an application programming interface (API)) that communicate via storage interface 210 to indicate to controller module 222 to perform the secure erase procedure. For example, in some embodiments "hdparm" may be used with various parameters or fields set to initiate the secure erase procedure on non-mechanical storage device 220. Various information obtained from other modules implemented by non-mechanical storage secure erasure module 200 may be used to populate such system calls or request messages, such as device password information obtained by authentication module 203 and device name and/or location obtained from device detection module 201.

In various embodiments, non-mechanical storage secure erasure module 200 may implement a device detection module 201. Device detection module 201 may perform various methods or techniques to detect one or more non-mechanical storage devices 220 that non-mechanical secure erasure module 220 may communicate with. For example, device detection module 201 may direct test or query messages (e.g., ping messages) to one non-mechanical storage devices 220 in order to receive a response and/or establish communication. Alternatively, device detection module 201 may interact with other hardware or software components, such as a device manager implemented by an operating system to determine whether any non-mechanical storage devices have been registered with the system. Such detection techniques may be performed periodically or aperiodically, such as in response to a request to initiate secure erasure and repair of non-mechanical storage devices. In at least some embodiments, device detection module may receive one or more indications from user interface module that request the device detection module to determine perform device detection. A location of a specific device or devices may also be indicated to device detection module 201 in order to establish a connection or confirm that a non-mechanical storage device may be communicated with at the location. Device detection module 201 may communicate information obtained to secure erase manager 205 or another module, such as analysis module 207, for further use or processing.

Non-mechanical storage secure erasure module 200 may also implement authentication module 203. Authentication module 203 may determine whether a user or other client requesting the performance of a secure erase procedure is authorized to perform the secure erase procedure. Such a determination may be made by requesting via user interface module 211 credentials from the requesting user, or by interacting with other system software or hardware components, such as by examining system user information to determine if the current user has a required authorization level to perform secure erasure. In at least some embodiments, authentication module 203 may also be configured to determine whether a password has been set for non-mechanical storage device 220. If yes, then authentication module 203 may be configured to request a device password from a user via user interface 211. If not, then authentication module 203 may be configured to generate and/or send a device password to secure erase manager 205 to set as the password by communicating with non-mechanical storage device 220.

In some embodiments, non-mechanical secure erasure module 200 may be configured to implement an analysis module 207. Analysis module 207 may receive various information from various other modules or components of non-mechanical secure erasure module 200, such as device information from device detection module 201, or other information previously sent to secure erase manager 205. Analysis module 207 may be configured to make a variety of different determinations concerning a given non-mechanical storage device, both before and after initiating performance of a secure erase procedure. In some embodiments, for instance, analysis module 207 may determine that the operational state of a non-mechanical storage device is frozen. Analysis module 207 may be configured to report results, findings and recommendations to secure erase manager 205 or another module of non-mechanical storage secure erasure module 200, such as analytics reporting module 209.

Analysis module 207 may also be configured to determine based on this device information that a non-mechanical storage device is eligible for the secure erase procedure, or alternatively that the secure erase procedure may not be performed on a non-mechanical storage device. To make this determination, analysis module 207 may implement the various techniques described in greater detail below with regard to FIGS. 3 and 4. For example, analysis module 207 may determine that a firmware bug is on a given non-mechanical storage device based on analyzing status or other information obtained from the non-mechanical storage device, such as a modified serial number which may indicate the presence of a firmware bug. Analysis module 207 may determine that some firmware bugs are repairable via the secure erase procedure, while some firmware bugs may not be repairable via the secure erase procedure. If the firmware bug is not repairable, in some embodiments, analysis module 207 may provide an indication via user interface module 211 that the non-mechanical storage device should be marked for, identified, or queued for physical destruction instead of the secure erase procedure.

In some embodiments, analysis module 207 may also be configured to perform analysis on storage device analytics data or other analytics data obtained from a storage device after a successful secure erase procedure. For example, storage device analytics data may include wear indicators, hours operated, errors, or other performance metrics for the non-mechanical storage device. Based one or more of these pieces of information, analysis module 207 may be configured to determine whether the non-mechanical storage device should be used again as storage or be disposed of. For example, in some embodiments analysis module 207 may be configured to determine whether or not a non-mechanical storage device exceeds a useful life threshold or other metric threshold, and if so, recommend the device for disposal.

Non-mechanical storage secure erasure module 200 may also implement, in some embodiments, an analytics reporting module 209. Analytics reporting module 209 may be configured to obtain device storage analytics data for non-mechanical storage devices 220. In some embodiments, analytics reporting module 209 may be configured to format and send analytics data to user interface module 211 for communication to a user. Similarly, such data may also be sent to secure erase manager 205 for further processing. Storage device analytics data may be broadly understood to include any form of information gather concerning a non-mechanical storage device both before and after initiating a secure erase procedure. For, example storage device analytics data may include device information such as device identification (e.g., name, serial number, manufacturer, etc.), or capabilities and configuration information (e.g., storage capacity, data transfer speeds) obtained prior to secure erase. Storage device analytics data may also include data collected about the use of the device such as available space, wearout indicators, number of hours operated, etc.

Storage device analytics data may be obtained by analytics reporting module by performing various system calls and querying other modules both within (e.g., device detection module) and without (e.g., relying upon various application programming interface (API) formats implemented by a device driver) non-mechanical storage secure erasure module 200. For example, in some embodiments a SMART interface may be activated or enabled by analytics reporting module 209, or another component such as secure erase manager 205, to query various ones of the types of information described above.

Non-mechanical storage secure erasure device 200 may also implement a user interface module 211, in some embodiments. User interface module 211 may be configured to interact with hardware and/or software components external to non-mechanical storage secure erasure module 200 to generate a user interface that accepts or receives input 202 or indications of user input. For example, user interface module may display information to a user by relying on an operating system to enable and present data on a display device, such as a monitor. Similarly, input received from a user 202 via an input/output device may be directed to user interface module 211 by an operating system configured to facilitate receiving such inputs.

In at least some embodiments, user interface module 211 may be configured to receive one or more indications via a user interface from user input 202 selecting a variety of different performance options or requests for the performance of specific tasks. For example, in some embodiments a user interface may receive indications of selections of these various performance options, such as perform to perform secure erasure and repair as a batch process, perform secure erasure and repair on one or more selected non-mechanical storage devices out of a larger group of connected or detected non-mechanical storage devices, automatic performance, or any other operation, function, or service provided by non-mechanical storage secure erasure module 200. These indications may be received, for example, via a command line interface that includes various command or command line flags. Alternatively, a graphical user interface may be generated and displayed to a user that presents various visual buttons, controls, or other selectors that allow for the selection of the various performance options that may be performed by non-mechanical storage secure erasure module 200. For instance, an indication to perform an analysis, such as one of the many performed by analysis module 207, may be requested. Various firmware bugs detected and/or other forms of device information may be obtained with performing other functions, such as secure erasure and repair. Analytics reporting module 209 may also be requested to format and prepare for display the various results of analysis module 207 and other components of non-mechanical storage secure erasure module 200.

User interface module 211 may also facilitate various requests for information from other components of non-mechanical storage secure erasure module 200, such as authentication information for authentication module 203, or various confirmations and warnings from secure erase manager 205. For example, a password prompt or user identification indication may be displayed for which user input may be received in response. In another example, in some embodiments, prior to initiating the secure erase procedure on a non-mechanical storage device, secure erase manager 205 may direct user interface module 211 to indicate a warning that the secure erase procedure is irreversible and/or request the user confirm the secure erase procedure on one or more devices. User interface module 211 may also facilitate communicate information back to a user. Information such as firmware bugs detected/repaired/remaining, device operational status (e.g., frozen), device storage analytics data, success or failure reports, may be indicated to a user via various communication techniques including displays, graphic and textual, and various message formats (e.g., emailed report summary).

As illustrated in FIG. 2, multiple non-mechanical storage devices 220a-n may communicate with non-mechanical storage secure erasure module. In some embodiments, non-mechanical storage secure erasure module may be configured to batch process multiple non-mechanical storage devices at a time. For example, a user may provide input requesting the batch processing of non-mechanical storage devices 220a-n. Non-mechanical storage secure erase module may perform the various steps illustrated with regard to FIGS. 3 and 4 below, and request individual or group confirmation of secure erase for those devices determined to be eligible for secure erase. The various information described above may be communicated to the user via user interface module 211. In at least some embodiments, non-mechanical secure erasure module 200 may perform the aforementioned steps automatically for a single non-mechanical storage device or as a batch process for multiple devices. A user request for such automatic performance may be received, in some embodiments, prior to performing automatically.

In at least some embodiments, non-mechanical storage secure erasure module 200 may be implemented on a secure system. A secure system may be, in some embodiments, a system that prevents external access to the one or more non-mechanical storage devices. For example, a system implementing non-mechanical storage secure erasure module may have no external network communication devices, and/or may have no other external storage device access ports (e.g., external USB) located on the system with which to store or transfer data from non-mechanical storage devices 220.

Please note, that the illustration given in FIG. 2 is provided as an example of one of many different ways secure erasure and repair non-mechanical storage media may be implemented. Various additional modules may be added or current modules removed, combined, or reconfigured to perform different operations and tasks. As such, the previous illustration is not intended to be limiting as to various other architectures or configurations of a non-mechanical storage secure erasure module.

Workflow of Secure Erasure and Repair of Non-Mechanical Storage Media

Figure 3:
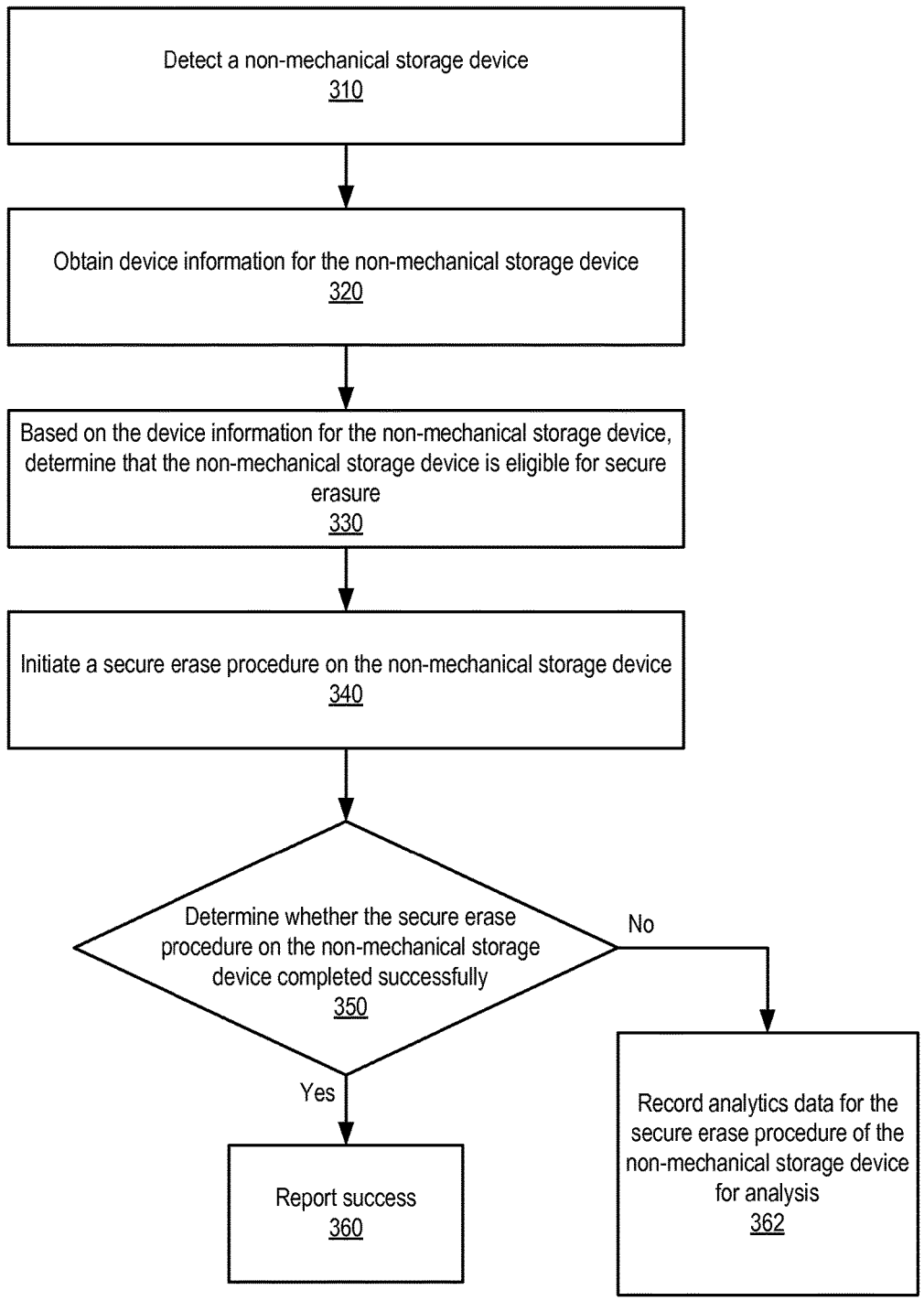
FIG. 3 is a high-level flowchart illustrating a method to implement secure erasure and repair of non-mechanical storage media, according to some embodiments.

As has been discussed above, non-mechanical storage devices may be analyzed and securely erased in order to repair malfunctioning non-mechanical storage devices or erase data stored on non-repairable non-mechanical storage devices in order to render the stored data unreadable and unrecoverable. In at least some embodiments, a computing device, such as the ones described above with regard to FIG. 2 or discussed below with regard to FIG. 5, may be used to implement a variety of different techniques for analyzing and securely erasing non-mechanical storage media. Various modules, such as non-mechanical secure erasure module 200, along with many different sub-modules or components may be configured to implement the methods and techniques described below. FIG. 3 illustrates a high-level flowchart of an example method to implement secure erasure and repair of non-mechanical storage media, according to some embodiments.

In various embodiments, one or more non-mechanical storage devices may be detected, as indicated at 310. Detecting non-mechanical storage embodiments may be implemented using many different techniques. For example, query messages may be sent via various methods, protocols, or types of connections, including, but not limited to, Universal Serial Bus (USB), IEEE 1394 interface, Serial ATA (SATA), external SATA (eSATA), Power over eSATA (eSATAp), to non-mechanical storage devices, which may, in return, respond with device information. In another example, non-mechanical storage devices when establishing communication for the first time may also register the device with locally accessible device data, which may be scanned to detect non-mechanical storage devices. In at least some embodiments, user input or other indications may be received that identify a location, address, or some other designator (e.g., "F:\" drive) of one or more non-mechanical storage devices to be detected.

Device information for the non-mechanical storage device may be obtained, as indicated at 320. Device information may include device identification, such as device name, location, serial number, etc. Device information may also include various other status information, such as whether or not device security has been enabled or other various features or attributes of the non-mechanical hardware storage device. This information may be obtained by directly querying the non-mechanical storage device, or from one or more locations where such data was previously stored, as discussed above in the example with regard to establishing initial communication with the non-mechanical storage device.

Figure 4:
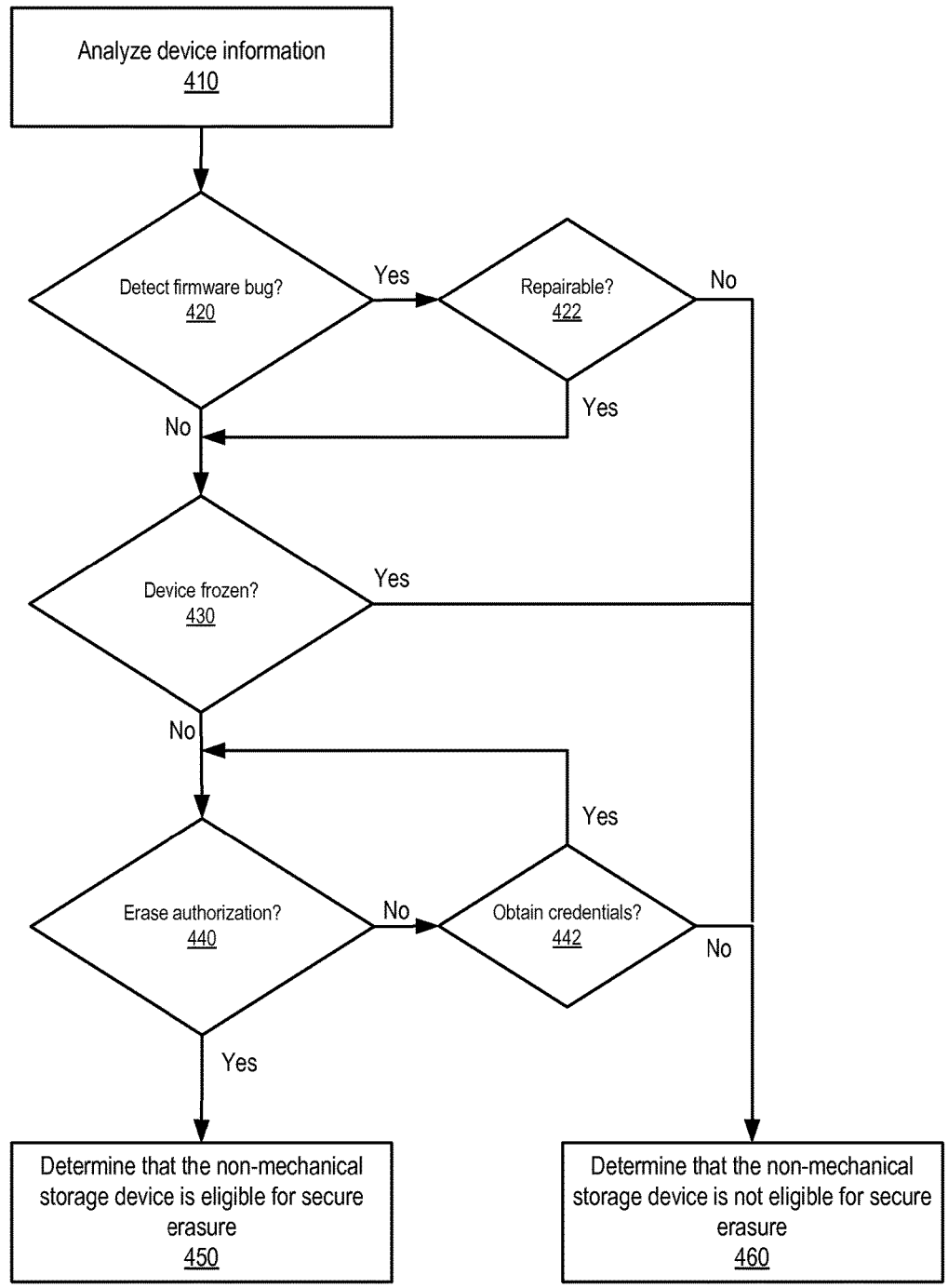
FIG. 4 is a high-level flowchart of a method to determine whether a non-mechanical storage device is eligible for secure erasure, according to some embodiments.

Whether the non-mechanical storage device is eligible for secure erasure may be determined, as indicated at 330. FIG. 4 illustrates various techniques and methods for making this determination. Device information may be analyzed 410. As discussed above with regard to analysis module 207 in FIG. 2, the device information obtained at 320, may be parsed and/or evaluated. As indicated at 420, device information may be analyzed to detect a firmware bug on the non-mechanical storage device. For example, some firmware bugs exhibit a common symptom whereby the serial number given for the non-mechanical storage device contains a certain character pattern. The "BAD_CTX" bug, the "CHAN_CE" bug, and the "NO_CONTEXT" bug, for instance, display the named characters as part of the serial number. Similarly, other firmware bugs may be detected relying upon similar symptoms or attributes in the device information. If a firmware bug is detected, then it must be determined whether the firmware bug is repairable via the secure erase procedure, as indicated at 422. For example, in some embodiments, the CHAN_CE firmware bug may be known to be non-repairable via the secure erase procedure. If determined to be a non-repairable firmware bug, then the non-mechanical storage device may be not eligible for secure erasure, as indicated at 460. Repairable firmware bugs, such as BAD_CTX and NO_CONTEXT, may be determined to be eligible for secure erasure (although not illustrated).

In some embodiments, further determinations concerning the non-mechanical storage device may be made. These determinations may be a part of the eligibility determination process for non-mechanical storage devices, or a separate determination made independently. Although illustrated in the context of the eligibility determination in FIG. 4, FIG. 4 is not to be construed as limiting as to different orderings and the removal of or additions to the workflow for determining non-mechanical storage device eligibility for secure erasure. For example, as noted above, in some embodiments, if a firmware bug is determined to be repairable, then the non-mechanical storage device may be determined to be eligible for secure erasure. Similarly, the non-mechanical storage device may be determined to be eligible for secure erasure if not frozen as indicated at 430.

As indicated at 430, a determination may be made as to whether the operational state of the non-mechanical storage device is frozen. This determination may be made, in some embodiments, by analyzing one or more of the various items of device information obtained at 320. For example, some non-mechanical storage devices may indicate explicitly in response to a query that the operational state is frozen. If the device is determined to be frozen, then the device may not be eligible for the secure erase procedure, as indicated at 460. In some embodiments, directions or instructions may be communicated, such as to a user, to attempt to power cycle or reset the frozen device. If the device is determined not to be frozen, then other determinations or analysis may be performed for the device, or the device may be determined to be eligible for secure erasure.

In at least some embodiments, erase authorization may be determined, as indicated at 440. Device information, such as device information obtained at 320, may indicate that security has been enabled on the non-mechanical storage device. Enabled security on a non-mechanical storage device may require a password or other credential to perform certain operations, such as secure erase. It may be determine at 440 whether the correct password or other credential is supplied to the non-mechanical storage device, thus authorizing the erase. An error message may be returned if the password or credential is incorrect. If the password or credential is unknown, then they may be obtained. For example, a password prompt may be displayed to a user to request the password or credential. If obtained, then erase is authorized, as indicated at 440 and the non-mechanical storage device is determined to be eligible for secure erase, as indicated at 450. Alternatively, at 440 it may be determined that the password or credential has not yet been set. Again credentials may be obtained, at 442, such as a default password or user entered password in response to a password set prompt. Then, as before, the erase is authorized at 440 and the non-mechanical storage device is determined to be eligible for secure erase.

Returning to FIG. 3, a secure erase procedure may be initiated on the non-mechanical storage device, as indicated at 340. Using the various mechanisms discussed above with regard to FIG. 2, a controller or other device on the non-mechanical storage device may perform the secure erase procedure (e.g., by sending a 20 volt signal to all data storage cells). It may then be determined whether the secure erase procedure completed successfully on the non-mechanical storage device, as indicated at 350. Such a determination may be made, in some embodiments, by querying the non-mechanical storage device for device information, (e.g., storage device analytics information discussed above with regard to FIG. 2). The response to the request and/or the content of the request may indicate whether the secure erase procedure completed successfully. For example, in some embodiments, if the device information indicates that security is disabled, then it may be determined that the secure erase procedure was successful. As the secure erase procedure may take approximately one minute to perform for some devices, the request for device information may be queried one or more times prior to the completion of the procedure.

Results of the secure erase procedure, such as success indicated at 360, may be reported. Other information may be reported in addition to the success or failure of the secure erase procedure. For example, in some embodiments it may be reported whether or not a previously detected firmware bug has also been repaired. If it is determined that the secure erase procedure did not complete successfully, then in addition to reporting failure, analytics data for the secure erase procedure of the non-mechanical storage device may be recorded for later analysis, as indicated at 360.

Although not illustrated, further determinations and analysis may be made and report upon completion of the secure erase procedure. For example, in some embodiments, if the secure erase procedure was determined not to complete successfully, then directions or instructions may be reported to identify or mark the non-mechanical storage device for physical destruction. In some embodiments, those non-mechanical storage devices that successfully completed the secure erase procedure may be determined to have exceeded a useful life threshold. Many other determinations, such as those discussed above with regard to analytics reporting module 207 in FIG. 2, may also be performed.

The method and techniques described in FIG. 3 may be performed for multiple non-mechanical storage devices as a batch process. A user interface or other similar component or device may communicate various warnings, requests, confirmations, directions and other such messages as discussed above with regard to FIGS. 2 and 3. Additionally, FIG. 3 has been provided to illustrate an example of possible techniques and methods for implementing secure erasure and repair of non-mechanical storage devices and is not to be construed as limiting as to other possible or different orderings, additions, modifications, or removals of the illustrated elements.

Example System

Embodiments of secure erasure and repair of non-mechanical storage media as described herein may be executed on one or more computer systems, which may interact with various other devices. One such computer system is illustrated by FIG. 5. In different embodiments, computer system 1000 may be any of various types of devices, including, but not limited to, a personal computer system, desktop computer, laptop, notebook, or netbook computer, mainframe computer system, handheld computer, workstation, network computer, a camera, a set top box, a mobile device, a consumer device, video game console, handheld video game device, application server, storage device, a peripheral device such as a switch, modem, router, or in general any type of computing or electronic device.

In the illustrated embodiment, computer system 1000 includes one or more processors 1010 coupled to a system memory 1020 via an input/output (I/O) interface 1030. Computer system 1000 further includes a network interface 1040 coupled to I/O interface 1030, and one or more input/output devices 1050, such as cursor control device 1060, keyboard 1070, and display(s) 1080. Display(s) 1080 may include standard computer monitor(s) and/or other display systems, technologies or devices. In at least some implementations, the input/output devices 1050 may also include a touch- or multi-touch enabled device such as a pad or tablet via which a user enters input via a stylus-type device and/or one or more digits. In some embodiments, it is contemplated that embodiments may be implemented using a single instance of computer system 1000, while in other embodiments multiple such systems, or multiple nodes making up computer system 1000, may be configured to host different portions or instances of embodiments. For example, in one embodiment some elements may be implemented via one or more nodes of computer system 1000 that are distinct from those nodes implementing other elements.

In various embodiments, computer system 1000 may be a uniprocessor system including one processor 1010, or a multiprocessor system including several processors 1010 (e.g., two, four, eight, or another suitable number). Processors 1010 may be any suitable processor capable of executing instructions. For example, in various embodiments, processors 1010 may be general-purpose or embedded processors implementing any of a variety of instruction set architectures (ISAs), such as the x86, PowerPC, SPARC, or MIPS ISAs, or any other suitable ISA. In multiprocessor systems, each of processors 1010 may commonly, but not necessarily, implement the same ISA.

In some embodiments, at least one processor 1010 may be a graphics processing unit. A graphics processing unit or GPU may be considered a dedicated graphics-rendering device for a personal computer, workstation, game console or other computing or electronic device. Modern GPUs may be very efficient at manipulating and displaying computer graphics, and their highly parallel structure may make them more effective than typical CPUs for a range of complex graphical algorithms. For example, a graphics processor may implement a number of graphics primitive operations in a way that makes executing them much faster than drawing directly to the screen with a host central processing unit (CPU). In various embodiments, graphics rendering may, at least in part, be implemented by program instructions configured for execution on one of, or parallel execution on two or more of, such GPUs. The GPU(s) may implement one or more application programmer interfaces (APIs) that permit programmers to invoke the functionality of the GPU(s). Suitable GPUs may be commercially available from vendors such as NVIDIA Corporation, ATI Technologies (AMD), and others.

System memory 1020 may be configured to store program instructions and/or data accessible by processor 1010. In various embodiments, system memory 1020 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing desired functions, such as those described herein are shown stored within system memory 1020 as program instructions 1025 and data storage 1035, respectively. In other embodiments, program instructions and/or data may be received, sent or stored upon different types of computer-accessible media or on similar media separate from system memory 1020 or computer system 1000. Generally speaking, a computer-accessible medium may include storage media or memory media such as magnetic or optical media, e.g., disk or CD/DVD-ROM coupled to computer system 1000 via I/O interface 1030. Program instructions and data stored via a computer-accessible medium may be transmitted by transmission media or signals such as electrical, electromagnetic, or digital signals, which may be conveyed via a communication medium such as a network and/or a wireless link, such as may be implemented via network interface 1040.

In one embodiment, I/O interface 1030 may be configured to coordinate I/O traffic between processor 1010, system memory 1020, and any peripheral devices in the device, including network interface 1040 or other peripheral interfaces, such as input/output devices 1050. In some embodiments, I/O interface 1030 may perform any necessary protocol, timing or other data transformations to convert data signals from one component (e.g., system memory 1020) into a format suitable for use by another component (e.g., processor 1010). In some embodiments, I/O interface 1030 may include support for devices attached through various types of peripheral buses, such as a variant of the Peripheral Component Interconnect (PCI) bus standard or the Universal Serial Bus (USB) standard, for example. In some embodiments, the function of I/O interface 1030 may be split into two or more separate components, such as a north bridge and a south bridge, for example. In addition, in some embodiments some or all of the functionality of I/O interface 1030, such as an interface to system memory 1020, may be incorporated directly into processor 1010.

Network interface 1040 may be configured to allow data to be exchanged between computer system 1000 and other devices attached to a network, such as other computer systems, or between nodes of computer system 1000. In various embodiments, network interface 1040 may support communication via wired or wireless general data networks, such as any suitable type of Ethernet network, for example; via telecommunications/telephony networks such as analog voice networks or digital fiber communications networks; via storage area networks such as Fibre Channel SANs, or via any other suitable type of network and/or protocol.

Input/output devices 1050 may, in some embodiments, include one or more display terminals, keyboards, keypads, touchpads, scanning devices, voice or optical recognition devices, or any other devices suitable for entering or retrieving data by one or more computer system 1000. Multiple input/output devices 1050 may be present in computer system 1000 or may be distributed on various nodes of computer system 1000. In some embodiments, similar input/output devices may be separate from computer system 1000 and may interact with one or more nodes of computer system 1000 through a wired or wireless connection, such as over network interface 1040.

Figure 5:
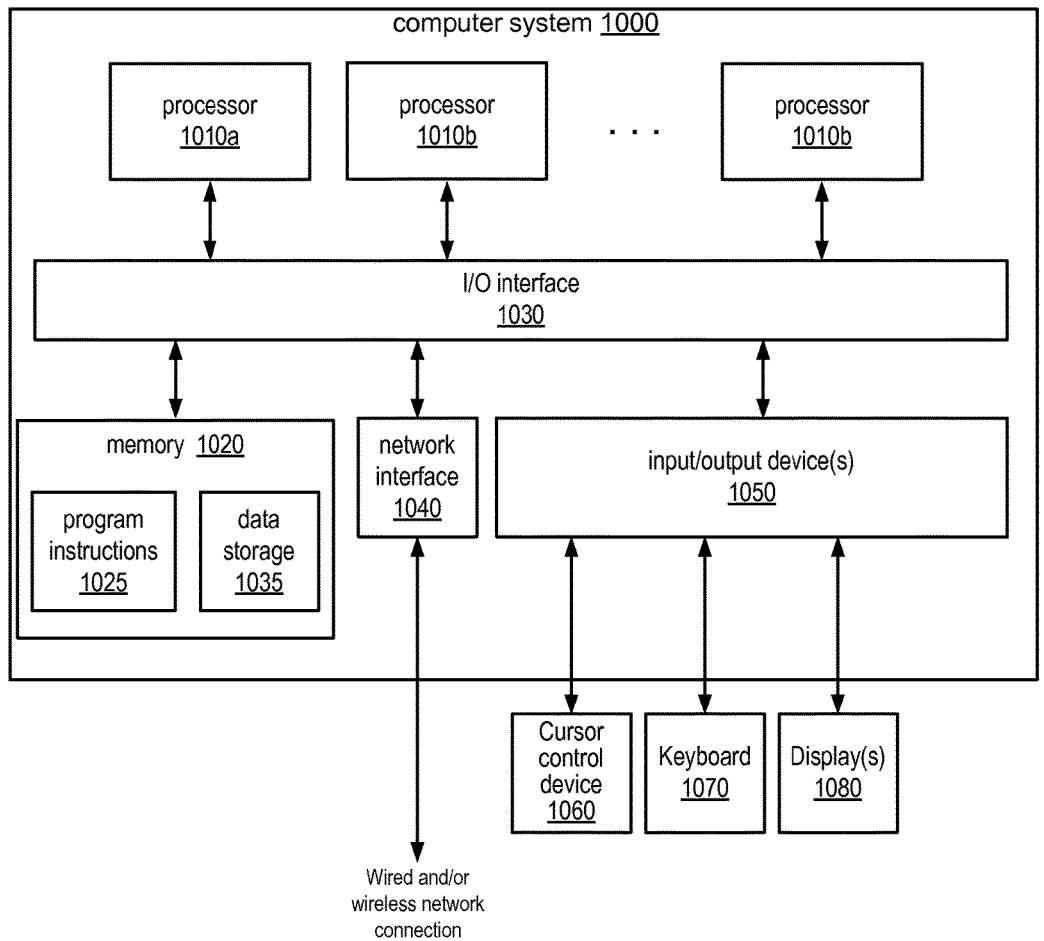
FIG. 5 illustrates an example system, according to some embodiments.

As shown in FIG. 5, memory 1020 may include program instructions 1025, configured to implement the various embodiments of secure erasure and repair of non-mechanical storage media as described herein, and data storage 1035, comprising various data accessible by program instructions 1025. In one embodiment, program instructions 1025 may include software elements of embodiments as described herein and as illustrated in the Figures. Data storage 1035 may include data that may be used in embodiments. In other embodiments, other or different software elements and data may be included.

Those skilled in the art will appreciate that computer system 1000 is merely illustrative and is not intended to limit the scope of the stereo drawing techniques as described herein. In particular, the computer system and devices may include any combination of hardware or software that can perform the indicated functions, including a computer, personal computer system, desktop computer, laptop, notebook, or netbook computer, mainframe computer system, handheld computer, workstation, network computer, a camera, a set top box, a mobile device, network device, internet appliance, PDA, wireless phones, pagers, a consumer device, video game console, handheld video game device, application server, storage device, a peripheral device such as a switch, modem, router, or in general any type of computing or electronic device. Computer system 1000 may also be connected to other devices that are not illustrated, or instead may operate as a stand-alone system. In addition, the functionality provided by the illustrated components may in some embodiments be combined in fewer components or distributed in additional components. Similarly, in some embodiments, the functionality of some of the illustrated components may not be provided and/or other additional functionality may be available.

Those skilled in the art will also appreciate that, while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-readable medium separate from computer system 1000 may be transmitted to computer system 1000 via transmission media or signals such as electrical, electromagnetic, or digital signals, conveyed via a communication medium such as a network and/or a wireless link. This computer readable storage medium may be non-transitory. Various embodiments may further include receiving, sending or storing instructions and/or data implemented in accordance with the foregoing description upon a computer-accessible medium. Accordingly, the present invention may be practiced with other computer system configurations.

CONCLUSION

Various embodiments may further include receiving, sending or storing instructions and/or data implemented in accordance with the foregoing description upon a computer-accessible medium. Generally speaking, a computer-accessible medium may include storage media or memory media such as magnetic or optical media, e.g., disk or DVD/CD-ROM, non-volatile media such as RAM (e.g. SDRAM, DDR, RDRAM, SRAM, etc.), ROM, etc., as well as transmission media or signals such as electrical, electromagnetic, or digital signals, conveyed via a communication medium such as network and/or a wireless link.

The various methods as illustrated in the Figures and described herein represent example embodiments of methods. The methods may be implemented in software, hardware, or a combination thereof. The order of method may be changed, and various elements may be added, reordered, combined, omitted, modified, etc.

Various modifications and changes may be made as would be obvious to a person skilled in the art having the benefit of this disclosure. It is intended that the invention embrace all such modifications and changes and, accordingly, the above description to be regarded in an illustrative rather than a restrictive sense.

What is claimed is:

1. A system, comprising:
    a non-mechanical storage device interface implemented in hardware, configured to communicate with one or more non-mechanical storage devices; and
    one or more hardware processors with associated memory implementing a non-mechanical storage secure erasure module, configured to:
        detect, via the non-mechanical storage device interface, the one or more non-mechanical storage devices;
        obtain device information for each of the one or more non-mechanical storage devices;
        analyze the device information for each of the one or more non-mechanical storage devices to determine that at least one of the one or more non-mechanical storage devices is eligible for secure erasure, wherein secure erasure is not performed for an ineligible non-mechanical storage device;
        initiate, via the non-mechanical storage device interface, a secure erase procedure that electrically resets representation of data stored on at least one of the one or more non-mechanical storage devices; and
        query, via the non-mechanical storage device interface, the at least one of the one or more storage devices for storage device analytics data to determine that the secure erase procedure on the at least one of the one or more non-mechanical storage devices completed successfully.

2. The system of claim 1,
    wherein, to analyze the device information for each of the one or more non-mechanical storage devices, the non-mechanical storage secure erasure module is further configured to detect a firmware bug on the at least one non-mechanical storage device, wherein said firmware bug is repairable via the secure erase procedure;
    wherein the non-mechanical storage secure erasure module is further configured to:
        based, at least in part, on the storage device analytics data for the at least one non-mechanical storage device, report that the secure erase procedure completed successfully and that the detected firmware bug was repaired.

3. The system of claim 1, wherein the non-mechanical storage secure erasure module is further configured to:
    perform said detecting, said obtaining, said analyzing, and said initiating for another non-mechanical storage device detected;
    query, via the non-mechanical storage device interface, the other non-mechanical storage devices for additional storage device analytics data to determine that the secure erase procedure on the other non-mechanical storage device failed to complete successfully; and
    record the additional storage device analytics data along with the failure of the non-mechanical storage device to complete successfully the secure erase procedure for further analysis.

4. The system of claim 1, wherein the system is configured to implement the non-mechanical storage device interface and the non-mechanical storage device secure erasure module to prevent external access to the one or more non-mechanical storage devices.

5. A method, comprising:
performing, by a computing device:
  detecting a non-mechanical storage device;
  obtaining device information for the non-mechanical storage device;
  analyzing the device information for the non-mechanical storage device to determine whether the non-mechanical storage device is eligible for secure erasure, wherein the analysis determines that the non-mechanical storage device is eligible, wherein secure erasure is not performed for an ineligible non-mechanical storage device;
  initiating a secure erase procedure that electrically resets representation of data stored on the non-mechanical storage device; and
  reporting a result of the secure erase procedure on the mechanical storage device.

6. The method of claim of 5,
wherein said analyzing the device information for the non-mechanical storage device comprises detecting a firmware bug on the non-mechanical storage device, wherein said firmware bug is repairable via the secure erase procedure;
wherein said reporting the result of the secure erase procedure on the mechanical storage device comprises reporting a status of the detected firmware bug.

7. The method of claim 5, further comprising:
detecting another non-mechanical storage device;
obtaining device information for the other non-mechanical storage device;
analyzing the device information for the other non-mechanical storage device to determine whether the other non-mechanical storage device is eligible for secure erasure, wherein the analysis detects that an operational state of the other non-mechanical storage device is frozen to determine that the other non-mechanical storage device is ineligible for secure erasure; and
in response to detecting that the operating state of the non-mechanical storage device is frozen, reporting that the non-mechanical storage device is frozen.

8. The method of claim of claim 5, further comprising:
detecting another non-mechanical storage device;
obtaining device information for the other non-mechanical storage device;
analyzing the device information for the other non-mechanical storage device to determine whether the other non-mechanical storage device is eligible for secure erasure, wherein the analysis detects that the other non-mechanical storage device was previously subject to unauthorized access to determine that the other non-mechanical storage device is ineligible for secure erasure; and
in response to detecting the unauthorized access of the other non-mechanical storage device, reporting the unauthorized access of the device.

9. The method of claim of claim 5, further comprising:
determining that the secure erase procedure on the non-mechanical storage device completed successfully;
wherein said reported result of the secure erase procedure includes that the secure erase procedure completed successfully.

10. The method of claim of claim 5, further comprising:
determining that the secure erasure procedure failed to complete successfully; and
recording analytics data for the secure erase procedure of the non-mechanical storage device for analysis.

11. The method of claim 5, wherein said detecting, said obtaining, said analyzing, and said initiating are performed for multiple non-mechanical storage devices including the non-mechanical storage device.

12. The method of claim 11, further comprising:
in response to receiving an indication to perform secure erase procedure batch processing, automatically performing said detecting, said obtaining, said analyzing, and said initiating for the multiple non-mechanical storage devices.

13. A non-transitory, computer-readable storage medium, storing program instructions that when executed by a computing device cause the computing device to perform:
detecting one or more non-mechanical storage devices;
obtaining device information for each of the one or more non-mechanical storage devices;
analyzing the device information for each of the one or more non-mechanical storage devices to determine whether each of the one or more non-mechanical storage devices is eligible for secure erasure, wherein secure erasure is not performed for an ineligible non-mechanical storage device;
initiating a secure erase procedure that electrically resets representation of data stored on at least one of the one or more non-mechanical storage devices; and
querying the at least one of the one or more storage devices for storage device analytics data to determine that the secure erase procedure on the at least one of the one or more non-mechanical storage devices completed successfully.

14. The non-transitory, computer-readable storage medium of claim 13, wherein, to perform said analyzing the device information for each of the one or more non-mechanical storage devices, the program instructions when executed by the computing device cause the computing device to perform:
detecting a firmware bug on the at least one non-mechanical storage device; and
reporting the success of the secure erase procedure on the at least one non-mechanical storage device and that the detected firmware bug remains on the at least one non-mechanical storage device.

15. The non-transitory, computer-readable storage medium of claim 13, wherein to perform the analysis of the device information for each of the one or more non-mechanical storage devices, the program instructions when executed by the computing device cause the computing device to determine that at least another one of the one or more non-mechanical storage devices is ineligible for secure erasure due to a detected firmware bug.

16. The non-transitory, computer-readable storage medium of claim 13, wherein the program instructions when executed by the computing device cause the computing device to perform said detecting, said obtaining, said analyzing, said initiating, and said querying via a non-mechanical storage secure erasure module, wherein the non-mechanical storage secure erasure module further comprises a user interface module, and the program instructions when executed by the computing device cause the computing device to perform, via the user interface module:
receiving a request to initiate the secure erase procedure prior to obtaining the device information for each of the one or more non-mechanical storage devices;
receiving confirmation that the secure erase procedure is to be performed on the at least one non-mechanical storage device prior to initiating the secure erase procedure on the at least one non-mechanical storage device; and indicating the successful completion of the secure erase procedure for the at least one non-mechanical storage device.

17. The non-transitory, computer-readable storage medium of claim 16, wherein the program instructions when executed by the computing device cause the computing device to determine, via the user interface module, that the request to initiate the secure erase procedure is received from an authorized user.

18. The non-transitory, computer-readable storage medium of claim 16, wherein to perform the analysis of the device information, the program instructions when executed by the computing device cause the computing device to determine that a different one of the one or more non-mechanical storage devices is eligible for secure erasure;

wherein the program instructions when executed by the computing device cause the computing device to perform, via the non-mechanical storage secure erasure module:

initiating a secure erase procedure on the different one of the one or more non-mechanical storage devices;

querying the different one of the one or more storage devices for storage device analytics data to determine that the secure erase procedure on the different one of the one or more non-mechanical storage devices failed to complete successfully;

wherein the program instructions when executed by the computing device cause the computing device to perform, via the user interface module:

indicating the failure to complete the secure erase procedure for the different one of the one or more non-mechanical storage devices; and indicating that the different one of the one or more non-mechanical storage devices is to be identified for physical destruction.

19. The non-transitory, computer-readable storage medium of claim 13, wherein the program instructions when executed by the computing device cause the computing device to perform:

determining, based at least in part, on the storage device analytics data for the at least one of the one or more non-mechanical storage devices that the storage device has exceeded a useful life threshold; and directing the at least one of the one or more non-mechanical storage devices to be removed from use.

20. The non-transitory, computer-readable storage medium of claim 13, wherein the program instructions when executed by the computing device cause the computing device to determine, based at least in part, on the storage device analytics data for the at least one of the one or more non-mechanical storage devices that the storage device has not exceeded a useful life threshold.

\* \* \* \* \*